United States Patent
Seok et al.

(10) Patent No.: US 12,116,072 B2
(45) Date of Patent: Oct. 15, 2024

(54) PARKING SYSTEM FOR PERSONAL MOBILITY, PERSONAL MOBILITY INCLUDING THE SAME, AND PARKING CONTROL METHOD OF PERSONAL MOBILITY

(71) Applicants: Hyundai Motor Company, Seoul (KR); Kia Corporation, Seoul (KR)

(72) Inventors: Donghee Seok, Suwon-si (KR); Duck Young Kim, Seongnam-si (KR); Ilsun Song, Seongnam-si (KR); Hee Jin Ro, Seoul (KR); Yocheol Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 831 days.

(21) Appl. No.: 17/246,045

(22) Filed: Apr. 30, 2021

(65) Prior Publication Data
US 2022/0089242 A1   Mar. 24, 2022

(30) Foreign Application Priority Data
Sep. 21, 2020   (KR) .......................... 10-2020-0121387

(51) Int. Cl.
| | |
|---|---|
| *B62J 45/415* | (2020.01) |
| *B60R 16/023* | (2006.01) |
| *B62H 1/06* | (2006.01) |
| *B62J 45/41* | (2020.01) |
| *B62K 15/00* | (2006.01) |

(52) U.S. Cl.
CPC ......... *B62J 45/415* (2020.02); *B60R 16/0233* (2013.01); *B62H 1/06* (2013.01); *B62J 45/41* (2020.02); *B62K 15/006* (2013.01); *B62K 2202/00* (2013.01)

(58) Field of Classification Search
CPC ................................ B62J 45/415; B62H 1/06
See application file for complete search history.

(56) References Cited

U.S. PATENT DOCUMENTS

| 2005/0156403 A1* | 7/2005 | Labonte ................. B62H 1/00 280/304 |
| 2022/0144360 A1* | 5/2022 | Jang ....................... B62K 23/02 |

FOREIGN PATENT DOCUMENTS

| CN | 205906098 U | * | 1/2017 | |
| CN | 206358253 U | * | 7/2017 | |
| DE | 102017206282 A1 | * | 10/2018 | |
| DE | 102017213875 A1 | * | 2/2019 | |
| GB | 2545014 A | * | 6/2017 | ............... B62H 1/02 |

(Continued)

*Primary Examiner* — Tony H Winner
*Assistant Examiner* — Hosam Shabara
(74) *Attorney, Agent, or Firm* — SLATER MATSIL, LLP (57) ABSTRACT

A parking system for a personal mobility includes at least one parking stand configured to be mounted on the personal mobility and to automatically unfold or fold, a boarding sensor configured to be mounted on the personal mobility and to detect whether the personal mobility is boarded or deboarded, and a controller configured to determine whether the personal mobility is boarded or deboarded based on the detection of the boarding sensor and to control operation of the parking stand so that the parking stand unfolds when the personal mobility is deboarded and the parking stand folds when the personal mobility is boarded.

11 Claims, 8 Drawing Sheets

(56) References Cited

FOREIGN PATENT DOCUMENTS

| | | | | |
|---|---|---|---|---|
| JP | 2011025877 | A | * 2/2011 | |
| JP | 5340853 | B2 | * 11/2013 | |
| KR | 20190120685 | | * 10/2019 | |
| WO | WO-2019215474 | A1 | * 11/2019 | ............... B62H 1/04 |

* cited by examiner

PARKING SYSTEM FOR PERSONAL MOBILITY, PERSONAL MOBILITY INCLUDING THE SAME, AND PARKING CONTROL METHOD OF PERSONAL MOBILITY

CROSS-REFERENCE TO RELATED APPLICATIONS

This application claims the benefit of Korean Patent Application No. 10-2020-0121387, filed in the Korean Intellectual Property Office on Sep. 21, 2020, which application is hereby incorporated herein by reference.

TECHNICAL FIELD

The present invention relates to a parking system for a personal mobility, a personal mobility including the same, and a control method thereof.

BACKGROUND

Recently, the use and spread of the personal mobility such as electric kickboards, electric wheels, and electric bicycles is expanding. The personal mobility is powered by electricity, and may be driven on roadways, sidewalks, narrow alleys, etc., and may be used as a means of transportation or leisure for moving a short distance.

The personal mobility is equipped with a parking stand for standing after use. Users may unfold the parking stand when parking their personal mobility, and fold the parking stand when driving.

However, the general personal mobility is inconvenient to use because the parking stand must be manually operated.

Since the general personal mobility cannot adjust the length of the parking stand, stable parking is possible with an appropriate inclination when parking on a flat surface, but may easily fall over when parking on a road or sidewalk with irregular surfaces or steep inclinations.

SUMMARY

The present invention relates to a parking system of a personal mobility, a personal mobility including the same, and a control method thereof. Particular embodiments relate to a parking system of a personal mobility equipped with a parking stand that automatically unfolds or folds, a personal mobility including the same, and a control method thereof.

One embodiment of the present invention provides a parking system for a personal mobility in which a parking stand is automatically unfolded or folded, a personal mobility including the same, and a control method thereof.

Another embodiment of the present invention provides a parking system for a personal mobility that allows parking at an appropriate inclination by automatically adjusting the spread of the parking stand according to the parking lot, a personal mobility including the same, and a control method thereof.

One embodiment of the present invention may provide a parking system for a personal mobility comprising at least one parking stand configured to mount on the personal mobility and automatically unfold or fold, a boarding sensor configured to mount on the personal mobility and detect whether a user is boarding, and a controller configured to determine whether the user is boarding based on the detection of the boarding sensor and control the operation of the at least one parking stand so that the at least one parking stand is unfolded when a user gets off and the at least one parking stand is folded when the user is boarding.

The parking system for the personal mobility may further include an inclination sensor configured to detect an inclination of the personal mobility, and a ground contact sensor configured to detect whether the at least one parking stand contacts the ground during parking.

The controller may maintain the unfolding of the at least one parking stand when the inclination measured by the inclination sensor is within a set inclination range in a state in which the at least one parking stand is in contact with the ground, and may control to correct the inclination by adjusting the spread of the at least one parking stand when the measured inclination is not within the set inclination range.

The at least one parking stand may include a fixing portion configured to be fixed to the personal mobility, an extension configured to be elastically coupled to the fixing portion, a transfer screw configured to be coupled to the extension and to stretch the extension in the longitudinal direction by rotation, and a parking motor configured to be fixed to the fixing portion and to rotate the transfer screw in a forward or reverse direction.

The fixing portion and the extension may be each provided in a tubular shape, and the extension may be coupled to the fixing portion so as to expand and contract in a rotation-limited state.

The at least one parking stand may further include a ground contact sensor for detecting whether the free end of the extension contacts the ground during parking.

The parking system for the personal mobility may further include a parking selection switch configured to allow a user to select an automatic or manual parking mode, and a manual parking switch configured to manually command the unfolding and folding of the at least one parking stand when the parking mode is manually selected.

Another embodiment of the present invention may provide a personal mobility comprising the parking system.

Another embodiment of the present invention may provide a parking control method of a personal mobility comprising a parking stand configured to automatically unfold or fold, and a boarding sensor configured to detect whether a user is boarding, wherein the parking control method may include controlling the parking stand to unfold and support the personal mobility when the boarding sensor detects a user is getting off.

The parking control method of the personal mobility may include determining whether a ground contact sensor provided in the parking stand contacts the ground when the parking stand is unfolded, and controlling to unfold the parking stand until the ground contact sensor contacts the ground.

The parking control method of the personal mobility may include measuring an inclination of the personal mobility through an inclination sensor provided in the personal mobility after unfolding the parking stand, determining whether the inclination is in a set inclination range (B), and controlling to correct the deviation of the inclination by adjusting the spreading degree of the parking stand when the inclination is not in the set inclination range.

The parking control method of the personal mobility may include controlling to release the support of the personal mobility by folding the parking stand unfolded in a parking state when detecting a user is boarding through the boarding sensor.

Another embodiment of the present invention may provides a parking control method of a personal mobility comprising a parking stand mounted on the personal mobility and configured to automatically unfold or fold, a boarding sensor configured to detect whether a user is boarding, an inclination sensor configured to detect an inclination of the personal mobility, a ground contact sensor configured to detect whether the parking stand is in contact with the ground, a parking selection switch configured to select an automatic or manual parking mode, and a manual parking switch configured to manually command the unfolding and folding of the parking stand, wherein the parking control method may include determining whether the parking mode by the parking selection switch is automatic or manual, detecting whether the user is boarding by a boarding sensor when the parking mode is automatic, and controlling the parking stand to unfold and support the personal mobility when the boarding sensor detects a user is getting off.

The parking control method of the personal mobility may include controlling to release the support of the personal mobility by folding the parking stand unfolded in a parking state when the boarding sensor detects the user is boarding when the parking mode is automatic.

The parking control method of the personal mobility may include controlling the parking stand to unfold and support the personal mobility when the user performs manual parking through the manual parking switch when the parking mode is manual.

The parking control method of the personal mobility may include controlling to release the support of the personal mobility by folding the parking stand when the user releases parking through the manual parking switch when the parking mode is manual.

Another embodiment of the present invention may provide a parking control method of a personal mobility comprising a parking stand configured to automatically unfold or fold, and a manual parking switch configured to manually command the unfolding and folding of the parking stand, the parking control method comprising controlling the parking stand to unfold and support the personal mobility when a user parks through the manual parking switch, and controlling to release the support of the personal mobility by folding the parking stand when the user releases parking through the manual parking switch.

The parking system for a personal mobility according to an exemplary embodiment of the present invention enables convenient use of the personal mobility because the parking stand is automatically unfolded or folded according to the user's boarding status in the automatic parking mode, and the parking stand is automatically unfolded or folded according to the user's command in the manual parking mode.

The parking system for a personal mobility according to the exemplary embodiment of the present invention may always park the personal mobility at an appropriate inclination regardless of the road surface condition of the parking lot because the spread of the parking stand is automatically adjusted according to the road surface of the parking lot.

BRIEF DESCRIPTION OF THE DRAWINGS

These and/or other aspects of the disclosure will become apparent and more readily appreciated from the following description of the embodiments, taken in conjunction with the accompanying drawings, in which.

DETAILED DESCRIPTION OF ILLUSTRATIVE EMBODIMENTS

Like numerals refer to like elements throughout the specification. Not all elements of embodiments of the present disclosure will be described, and description of what are commonly known in the art or what overlap each other in the embodiments will be omitted.

Reference numerals used for method steps are just used for convenience of explanation, but not to limit an order of the steps. Thus, unless the context clearly dictates otherwise, the written order may be practiced otherwise.

Hereinafter, a vehicle and a controlling method of the same according to embodiments of the invention will be described with reference to the accompanying drawings.

Figure 1:
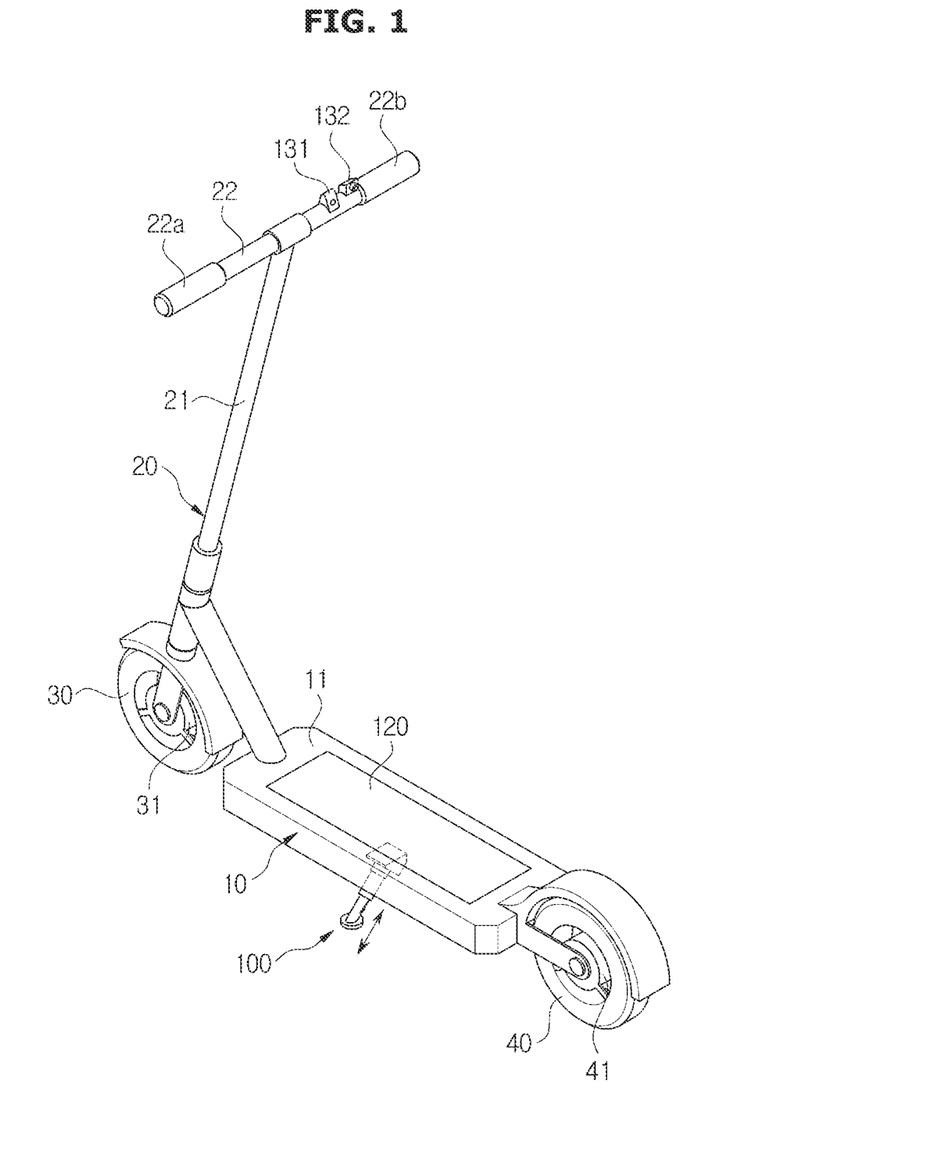
FIG. 1 is a perspective view of a personal mobility to which a parking system according to an exemplary embodiment of the present invention is applied.
Figure 2:
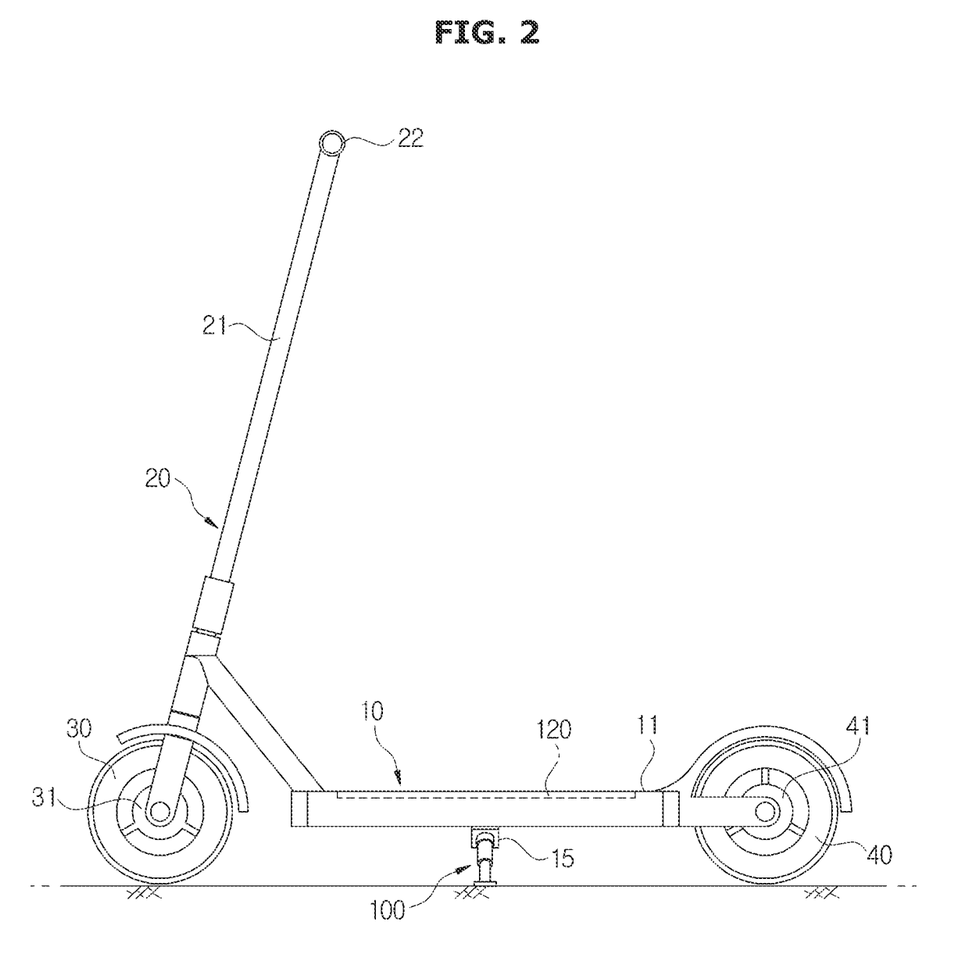
FIG. 2 is a side view of a personal mobility to which a parking system according to an exemplary embodiment of the present invention is applied.

Referring to FIG. 1 and FIG. 2, a personal mobility provided with a parking system according to an embodiment of the present invention includes a main body 10 provided with a footrest 11, a steering device 20 provided in front of the main body 10, a front wheel 30 installed at the lower end of the steering device 20 and a rear wheel 40 installed at the rear end of the main body 10.

The steering device 20 is a steering shaft 21 rotatably installed at the front end of the main body 10, and a steering handle 22 connected to the upper end of the steering shaft 21 and provided with a left hand grip 22a and a right hand grip 22b.

The front wheel 30 and the rear wheel 40 may each include drive motors 31 and 41, respectively, for driving, and a braking device for braking. The main body 10 may include a battery that supplies electric power to the driving motors 31 and 41 of the front wheel 30 and the rear wheel 40. At least one of the left hand grip 22a and the right hand grip 22b of the steering handle 22 may include a function to control driving and braking by a user's manipulation.

Figure 6:
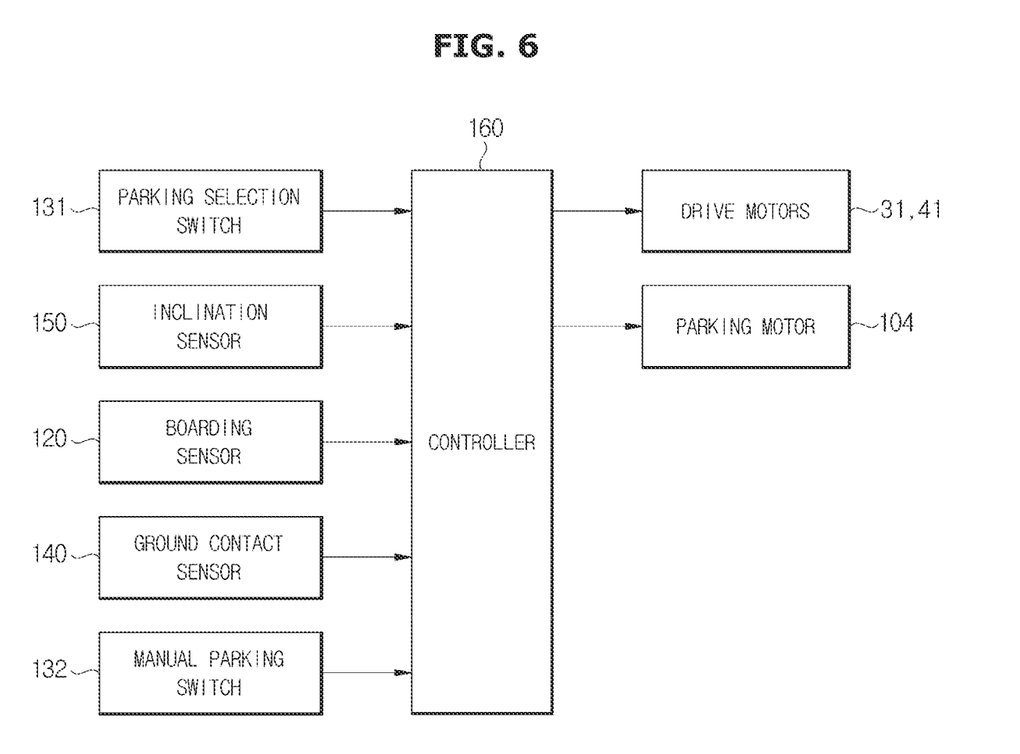
FIG. 6 is a control block diagram of a parking system according to an exemplary embodiment of the present invention.

Referring to FIG. 1 and FIG. 6, the parking system may include a parking stand 100 installed under the main body 10, a boarding sensor 120 installed on the footrest 11 of the main body 10, a parking selection switch 131 and manual parking switch 132 installed on the steering handle 22, a ground contact sensor 140 installed on the parking stand 100, an inclination sensor 150 installed on the main body 10, and a controller 160 for controlling a parking operation. The controller 160 may function not only to control the parking operation, but also to control the operation of the driving motors 31 and 41 of the front wheel 30 and the rear wheel 40 and the brake system.

The present embodiment presents an electric kickboard as an example of the personal mobility to which the parking system is applied, but the personal mobility to which the parking system is applied is not limited thereto, and may be a small mobility means for one or two persons, such as an electric bicycle and an electric wheel.

Figure 3:
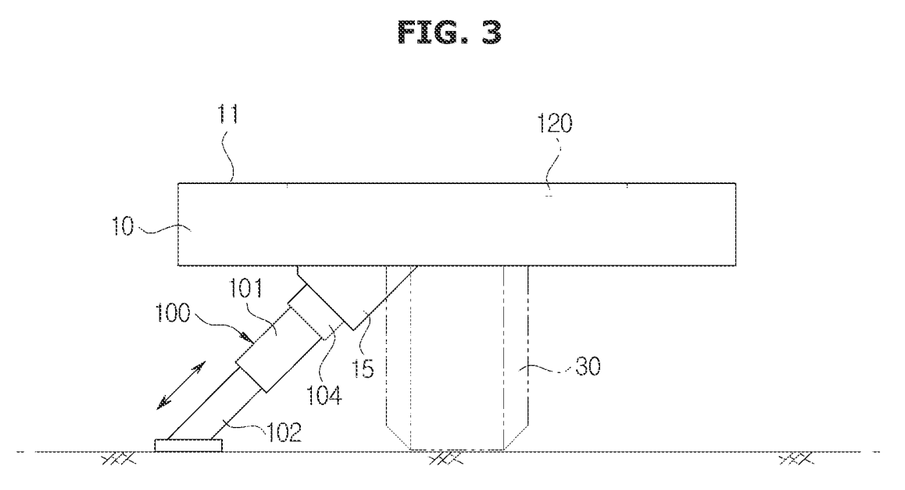
FIG. 3 is a side view of a parking stand of a parking system according to an exemplary embodiment of the present invention.

Referring to FIG. 3 and FIG. 6, the parking stand 100 may be mounted under the main body 10. The parking stand 100 may be automatically extended and unfolded in length for parking of the personal mobility, and may be folded in reverse for driving of the personal mobility. The folding operation may also be performed automatically. The parking stand 100 may be obliquely extended from the lower surface of the main body 10 toward the lower side to the side so as to stably support the personal mobility during parking.

Figure 4:
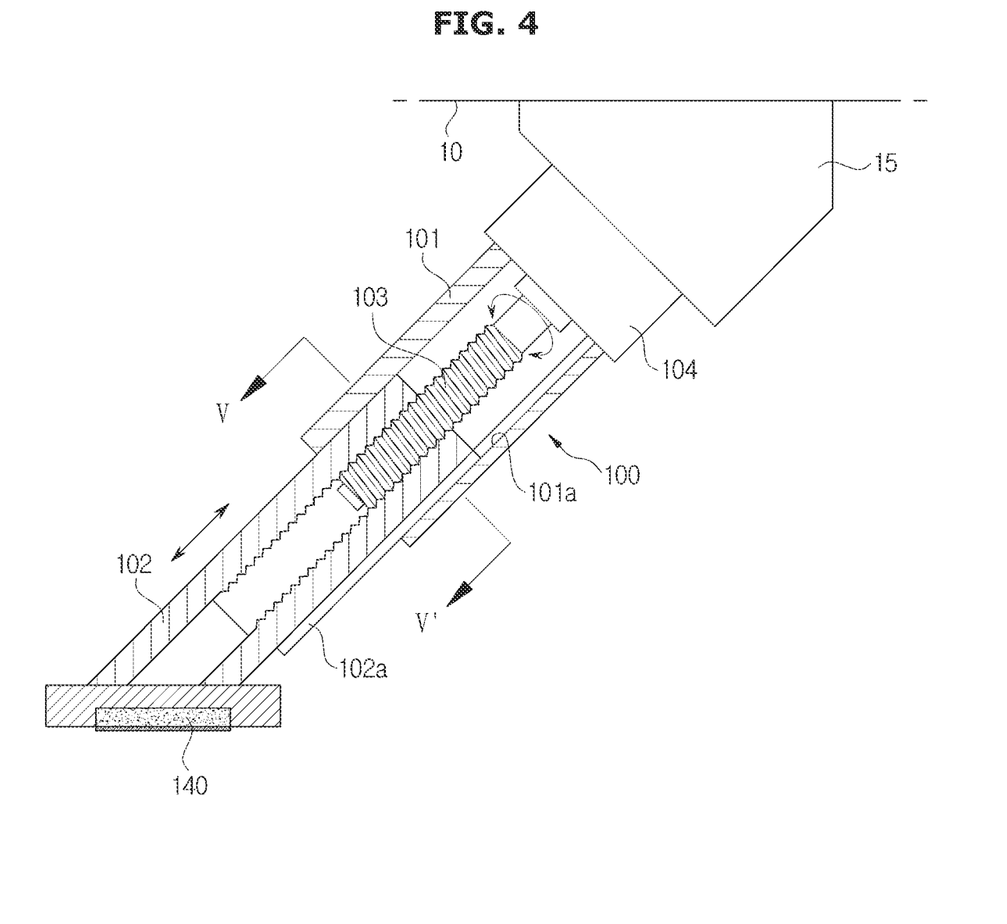
FIG. 4 is a cross-sectional view of a parking stand of a parking system according to an exemplary embodiment of the present invention.

Referring to FIG. 4, the parking stand 100 may include the fixing portion 101 fixed to the main body 10, an extension 102 elastically coupled to the fixing portion 101, a transfer screw 103 coupled to the extension 102 and stretching the extension 102 in the longitudinal direction by rotation, and a parking motor 104 configured to be fixed to the fixing portion 101 and rotate the transfer screw 103 in the forward or reverse direction.

The parking motor 104 may be fixed to the support portion 15 provided on the lower surface of the main body 10, and one end of the fixing portion 101 may be fixed to the casing of the parking motor 104. Each of the fixing portion 101 and the extension 102 may have a long tubular shape. The extension 102 may be provided with an outer diameter of a size corresponding to the inner diameter of the fixing portion 101, and be slidably coupled to the fixing portion 101 in a state in which one side of the fixing portion 101 enters the inside.

Figure 5:
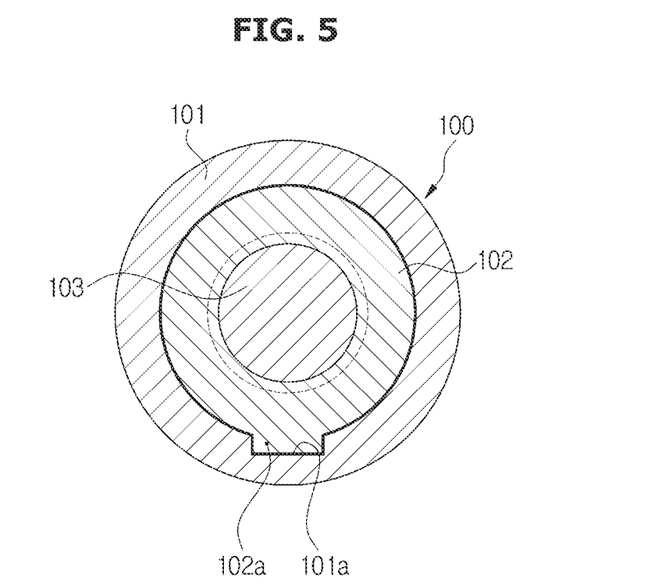
FIG. 5 is a cross-sectional view taken along line V-V' of FIG. 4.

The extension 102 may be coupled to the fixing portion 101 to stretch in a rotation-limited state. To this end, as shown in FIG. 5, a key groove 101*a* formed long in the longitudinal direction is provided on the inner surface of the fixing portion 101, and a key 102*a* formed long in the longitudinal direction so as to be coupled in correspondence with the key groove 1001*a* may be provided on the outer surface of the extension 102.

In the parking stand 100, the parking motor 104 may rotate the transfer screw 103 in a forward or reverse direction to stretch the length of the extension 102 exposed to the outside of the fixing portion 101. Therefore, the parking stand 100 may be extended and unfolded for parking, and may be shortly folded for driving.

The parking stand 100 includes a ground contact sensor 140 installed on the free end of the extension 102 to detect whether the free end of the extension 102 contacts the ground when it is extended for parking. The ground contact sensor 140 may be a pressure sensor.

Referring to FIG. 1 and FIG. 6, the boarding sensor 120 may be installed on the upper surface of the footrest 11 of the main body 10. The boarding sensor 120 may be configured as a pressure sensor, and may detect whether a user boards on the footrest 11 or gets off the footrest 11. The sensing information of the boarding sensor 120 is transmitted to the controller 160, and the controller 160 may control the operation of the parking motor 104 of the parking stand 100 based on this.

The parking selection switch 131 allows a user to automatically or manually select a parking mode of the parking system in advance. Here, the automatic parking mode is a mode in which the parking stand 100 is automatically extended and unfolded to enable parking when the user gets off, and the parking stand 100 is automatically folded to enable driving when the user boards. The manual parking mode is a mode in which the user may control the unfolding and folding of the parking stand 100 by manipulating the manual parking switch 132 regardless of whether the user is on board.

When the parking mode is manually selected by the parking selection switch 131, the manual parking switch 132 may be operated by a user to manually command the unfolding and folding of the parking stand 100.

The inclination sensor 150 may detect the inclination of the main body 10 in a state built into the main body 10. The inclination sensor 150 may be a gyro sensor applied to a general personal mobility.

The controller 160 may determine whether the user has boarded the personal mobility based on the detection of the boarding sensor 120, and may control the operation of the parking motor 104 of the parking stand 100 so that the parking stand 100 is automatically unfolded when the user gets off and the parking stand 100 is automatically folded when the user boards.

The controller 160 may control the operation of the parking motor 104 of the parking stand 100 so that the parking stand 100 is automatically unfolded when the user commands the parking operation through the manual parking switch 132 and the parking stand 100 is automatically folded when the user commands the parking release through the manual parking switch 132, in a state in which the parking selection switch 131 is selected as the manual parking mode.

In the parking system of the present embodiment, the spread of the parking stand 100 may be automatically adjusted according to the road surface condition at the parking place so that the personal mobility maintains an appropriate inclination and stably parks regardless of the road surface condition of the parking place.

To this end, the controller 160 may control the parking stand 100 to remain unfolded when the inclination A measured by the inclination sensor 150 is in a set inclination range B and may control by adjusting the unfolding of the parking stand 100 to correct the inclination A when the measured inclination A is not in the set inclination range B, in a state in which when parking, parking stand 100 is unfolded as an initial setting condition and the parking stand 100 is in contact with the ground. Here, the set inclination range B is the inclination range in which the personal mobility may be maintained without falling.

When the personal mobility is parked in a place where the inclination is severe or the road surface is irregular, even after the parking stand 100 is unfolded, the inclination A of the personal mobility may deviate from the set inclination range B, and in this case, the controller 160 may calculate the deviation between the inclination A and the set inclination range B, and adjust the length of the parking stand 100 so as to correct the inclination deviation, thereby adjusting the inclination A of the personal mobility. That is, the length of the parking stand 100 may be adjusted so that the inclination A of the personal mobility reaches the set inclination range B, and through this, it is possible to enable stable parking even on inclined or irregular road surfaces.

Next, a parking control method of a personal mobility to which the parking system according to the present embodiment is applied will be described with reference to the flowchart of FIG. 7.

The controller 160 determines whether the personal mobility is stopped for parking (171), determines whether the parking mode selected by the parking selection switch 131 is automatic when the personal mobility stops (172), and determines whether or not the user gets off through the detection of the boarding sensor 120 in the case of the automatic parking mode (173).

When it is determined that the user gets off in step 173, the controller 160 operates the parking motor 104 of the parking stand 100 so that the parking stand 100 is unfolded (175), and determines whether the unfolding of the parking stand 100 has been completed (176). At this time, the controller 160 may determine that the unfolding of the parking stand 100 is completed when the ground contact sensor 140 of the parking stand 100 contacts the ground, or determine that the unfolding of the parking stand 100 is completed when the parking stand 100 is extended to an initial set length for parking.

After the unfolding of the parking stand 100 is completed, the controller 160 measures the inclination A of the personal mobility in the initial state of parking through the inclination sensor 150 (177), and determines whether the measured inclination A is in a set inclination range B (178).

In step 178, since stable parking is possible when the inclination A of the personal mobility is in the set inclination range B, the controller 160 completes parking while maintaining the state of the parking stand 100 (180). However, when the inclination A is out of the set inclination range B, the controller 160 adjusts the unfolding of the parking stand 100 to correct the deviation of the inclination (179).

At this time, the controller 160 may calculate the deviation between the measured inclination A and the set inclination range B, and may change the inclination A of the personal mobility to a stable state by operating the parking motor 104 to correct the inclination deviation and adjusting the length of the parking stand 100.

Thereafter, the controller 160 measures the inclination A of the personal mobility again (177), determines whether the measured inclination A is in the set inclination range B (178), and completes the parking process when the inclination A is within the set inclination range B (180).

When it is determined that the automatic parking mode is not selected in step 172, the controller 160 determines whether there is a command for executing manual parking by the manual parking switch 132 (174), and when there is a command for executing manual parking, the controller 160 executes the parking control from steps 175 to 180 described above.

After parking completion at step 180, the controller 160 determines whether the automatic parking mode is selected (181), determines whether the user is boarding through detection of the boarding sensor 120 when automatic parking mode is selected (182), and causes the parking stand 100 to release support for the personal mobility by operating the parking motor 104 so that the parking stand 100 unfolded in a parking state is folded when the user boards (184).

If it is determined that the automatic parking mode is not selected in step 181, the controller 160 determines whether there is a command for releasing manual parking by the manual parking switch 132 (183), and operates the parking motor 104 so that the parking stand 100 unfolded in the parking state is folded when there is an instruction to release the manual parking (184).

As described above, in the parking system of a personal mobility according to the present embodiment, the parking stand 100 is automatically unfolded or folded according to whether the user is boarding in the automatic parking mode and the parking stand 100 is also automatically unfolded or folded according to the user's command in the manual parking mode, enabling convenient use of personal mobility.

In addition, since the parking system of the personal mobility according to the present embodiment automatically adjusts the unfolding of the parking stand 100 according to the road surface condition of the parking place, the personal mobility may always be parked at an appropriate inclination regardless of the road surface condition of the parking place.

In the above-described embodiment, the parking system allows the user to select the automatic parking mode and the manual parking mode using the parking selection switch 131 and the manual parking switch 132, but the unfolding and folding of the parking stand 100 are always automatic. If it is to be implemented automatically, the parking selection switch 131 and the manual parking switch 132 may be excluded. In this case, step 172, step 174, step 181, and step 183 may be excluded from the parking control method of FIG. 7.

Figure 7:
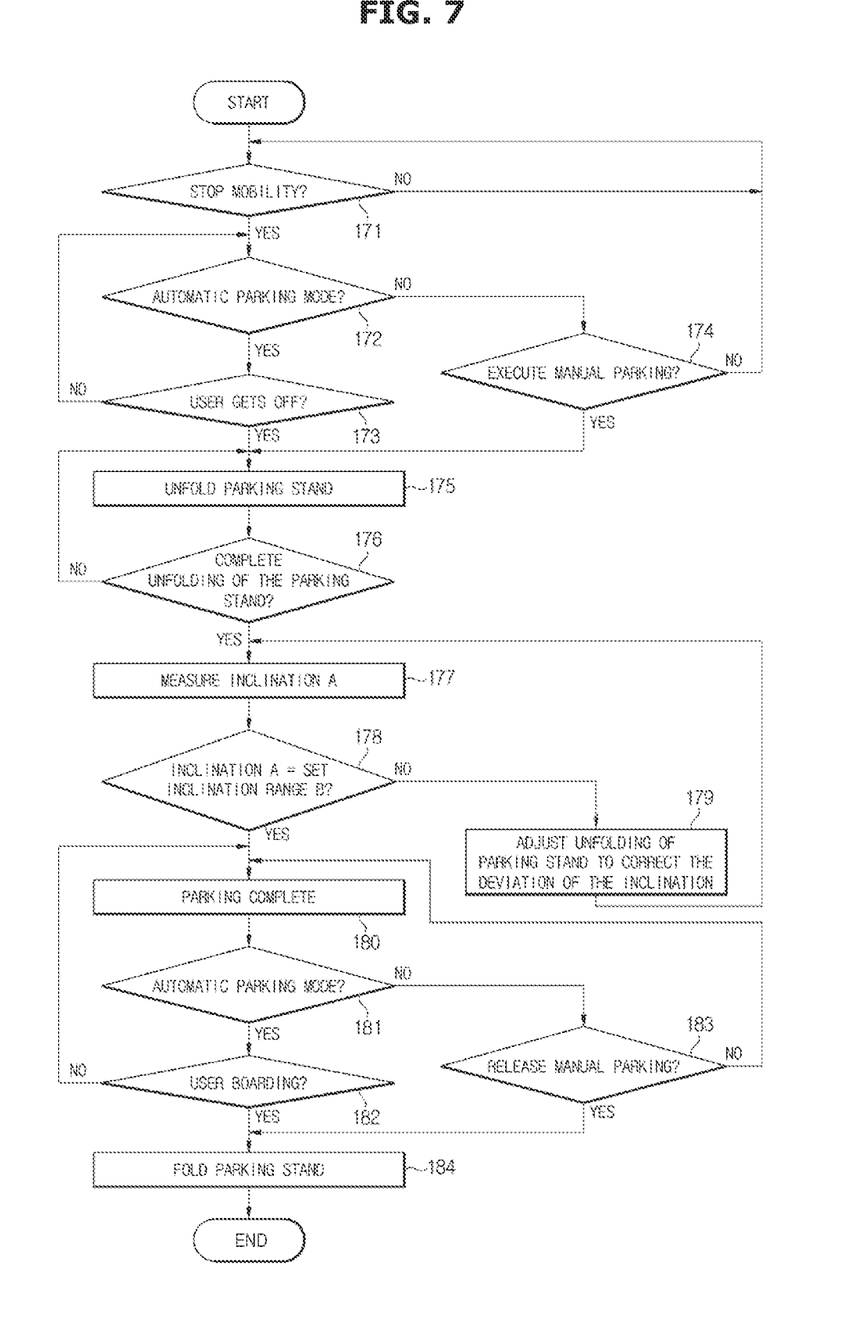
FIG. 7 is a flowchart illustrating a parking control method for a personal mobility to which a parking system according to an exemplary embodiment of the present invention is applied.

In addition, if it is desired to maintain only the manual parking mode contrary to the above case, the parking system may be operated in a state excluding the parking selection switch 131 and the boarding sensor 120, and steps 172, 173, 181 and 182 may be excluded in the parking control method of FIG. 7.

Figure 8:
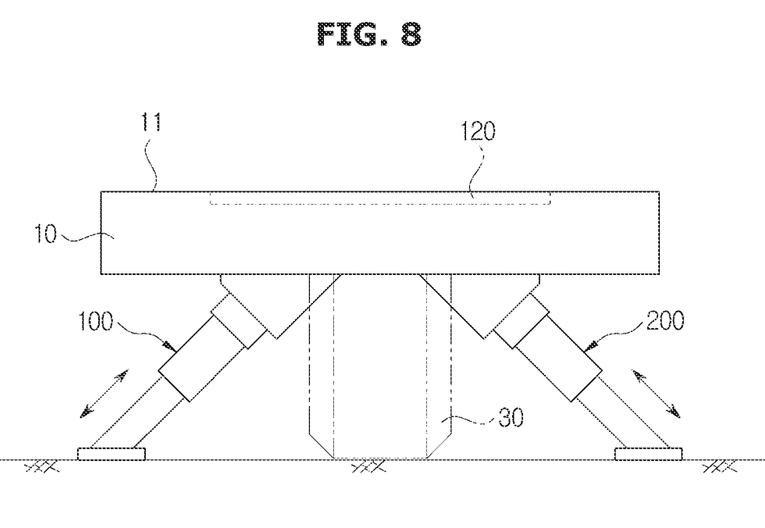
FIG. 8 illustrates a case in which two parking stands are applied to a parking system according to an exemplary embodiment of the present invention.

FIG. 8 illustrates a case in which two parking stands 100 and 200 are applied to a parking system according to an exemplary embodiment of the present invention. In the example of FIG. 8, two parking stands 100 and 200 are installed to be symmetrical on both sides of the lower body 10 of the personal mobility. In this case, the two parking stands 100 and 200 on both sides may be individually controlled by the controller 160, and may have mutual lengths to be adjusted according to the road surface of the parking lot while in contact with the ground for adjusting the inclination of the personal mobility.

What is claimed is:

1. A parking control method of a personal mobility vehicle comprising a parking stand configured to automatically unfold or fold, and a boarding sensor configured to detect whether the personal mobility vehicle is boarded or deboarded, the parking control method comprising:
   controlling the parking stand to unfold and to support the personal mobility vehicle when the boarding sensor detects the personal mobility vehicle is deboarded,
   controlling to release the support of the personal mobility vehicle by folding the parking stand unfolded in a parking state when detecting through the boarding sensor that the personal mobility vehicle is boarded.

2. The parking control method of claim 1, further comprising:
   determining whether a ground contact sensor provided in the parking stand contacts the ground when the parking stand is unfolded; and
   controlling to unfold the parking stand until the ground contact sensor contacts the ground.

3. The parking control method of claim 2, further comprising:
   measuring an inclination of the personal mobility vehicle through an inclination sensor provided in the personal mobility vehicle after unfolding the parking stand;
   determining whether the inclination is in a set inclination range; and
   controlling to correct a deviation of the inclination by adjusting a spreading degree of the parking stand when the inclination is not in the set inclination range.

4. A parking control method of a personal mobility vehicle comprising a parking stand mounted on the personal mobility vehicle and configured to automatically unfold or fold, a boarding sensor configured to detect whether the personal mobility vehicle is boarded or deboarded, an inclination sensor configured to detect an inclination of the personal mobility vehicle, a ground contact sensor configured to detect whether the parking stand is in contact with the ground, and a parking selection switch configured to select a parking mode, the parking control method comprising:

- determining whether the parking mode selected by the parking selection switch is an automatic mode or a manual mode;
- detecting, by the boarding sensor, whether the personal mobility vehicle is boarded or deboarded when the parking mode is the automatic mode; and
- controlling the parking stand to unfold to support the personal mobility vehicle when the boarding sensor detects the personal mobility vehicle is deboarded.

5. The parking control method of claim 4, further comprising:

- determining whether the ground contact sensor is in contact with the ground when the parking stand is unfolded; and
- controlling to unfold the parking stand until the ground contact sensor contacts the ground.

6. The parking control method of claim 5, further comprising:

- measuring an inclination of the personal mobility vehicle through the inclination sensor after unfolding the parking stand;
- determining whether the inclination is in a set inclination range; and
- controlling to correct a deviation of the inclination by adjusting a spreading degree of the parking stand when the inclination is not in the set inclination range.

7. The parking control method of claim 4, further comprising controlling to release the support of the personal mobility vehicle by folding the parking stand unfolded in a parking state when the boarding sensor detects the personal mobility vehicle is boarded when the parking mode is the automatic mode.

8. The parking control method of claim 4, wherein the personal mobility vehicle further comprises a manual parking switch configured to manually command unfolding and folding of the parking stand, wherein the parking control method further comprises controlling the parking stand to unfold to support the personal mobility vehicle when manual parking is performed through the manual parking switch when the parking mode is the manual mode.

9. The parking control method of claim 8, further comprising:

- determining whether the ground contact sensor contacts the ground when the parking stand is unfolded; and
- controlling to unfold the parking stand until the ground contact sensor contacts the ground.

10. The parking control method of claim 9, further comprising:

- measuring an inclination of the personal mobility vehicle through the inclination sensor after unfolding the parking stand;
- determining whether the inclination is in a set inclination range; and
- controlling to correct a deviation of the inclination by adjusting a spreading degree of the parking stand when the inclination is not in the set inclination range.

11. The parking control method of claim 8, further comprising controlling the parking stand unfolded in a parking state to be folded to release the support of the personal mobility vehicle when manual parking is released through the manual parking switch when the parking mode is the manual mode.

* * * * *